US012811842B2

(12) United States Patent
Yamazoe et al.

(10) Patent No.: US 12,811,842 B2
(45) Date of Patent: Nov. 24, 2026

(54) NETWORK MANAGEMENT APPARATUS, METHOD, AND PROGRAM

(71) Applicant: NTT, Inc., Tokyo (JP)

(72) Inventors: Mayu Yamazoe, Musashino (JP); Shunsuke Kanai, Musashino (JP); Masataka Sato, Musashino (JP); Kazuaki Akashi, Musashino (JP); Manami Ogawa, Musashino (JP)

(73) Assignee: NTT, Inc., Tokyo (JP)

( * ) Notice: Subject to any disclaimer, the term of this patent is extended or adjusted under 35 U.S.C. 154(b) by 105 days.

(21) Appl. No.: 18/868,008

(22) PCT Filed: Jun. 2, 2022

(86) PCT No.: PCT/JP2022/022544

§ 371 (c)(1),
(2) Date: Nov. 21, 2024

(87) PCT Pub. No.: WO2023/233635

PCT Pub. Date: Dec. 7, 2023

(65) Prior Publication Data

US 2026/0197224 A1 Jul. 9, 2026

(51) Int. Cl.
*H04L 41/0631* (2022.01)
*H04L 41/06* (2022.01)

(52) U.S. Cl.
CPC .......... *H04L 41/0631* (2013.01); *H04L 41/06* (2013.01)

(58) Field of Classification Search
CPC . H04L 41/0677; H04L 41/0631; H04L 41/06; G06F 11/2015; G06F 11/2023
See application file for complete search history.

(56) References Cited

U.S. PATENT DOCUMENTS 11,736,338 B2 * 8/2023 Fukami ............... H04L 41/0677 709/224
11,765,019 B2 * 9/2023 Nishikawa .......... H04L 41/0631 709/224

(Continued)

FOREIGN PATENT DOCUMENTS

JP H0573440 A 3/1993
JP 2012105004 A 5/2012

(Continued)

OTHER PUBLICATIONS

Fukami et al., "Study on Method of Identifying Service Influence Occurred by Network Fault," IEICE Technical Report, Feb. 2019, 118(483):13-18, 13 pages (with machine translation).

(Continued)

*Primary Examiner* — David R Lazaro
(74) *Attorney, Agent, or Firm* — Fish & Richardson P.C.

(57) ABSTRACT

A network management device according to an embodiment includes: a storage device that stores information indicating a connection relationship between a plurality of communication devices and a communication path in a network configuration; and a determination unit that, when power from a main power supply is no longer supplied to one of the plurality of communication devices and power from a standby power supply is no longer suppliable to the communication device, determines that a failure has occurred in the communication device and determines a communication device to be affected by the failure that has occurred as a failure influence range on the basis of the information stored in the storage device.

11 Claims, 22 Drawing Sheets

(56) References Cited

U.S. PATENT DOCUMENTS

| | | | | |
|---|---|---|---|---|
| 12,200,514 | B2 * | 1/2025 | Okada | H04L 41/0686 |
| 2002/0010770 | A1 * | 1/2002 | Ueno | H04L 41/044<br>714/25 |
| 2011/0022882 | A1 * | 1/2011 | Jaehde | G06F 11/2035<br>714/E11.073 |
| 2014/0092752 | A1 * | 4/2014 | Hui | H04B 1/713<br>370/242 |
| 2018/0351840 | A1 * | 12/2018 | Kondo | H04L 41/065 |
| 2022/0224591 | A1 * | 7/2022 | Fukami | H04L 41/0677 |
| 2023/0099411 | A1 * | 3/2023 | Nishikawa | H04L 43/091<br>709/224 |
| 2026/0197224 | A1 * | 7/2026 | Yamazoe | H04L 41/0631 |

FOREIGN PATENT DOCUMENTS

| | | | |
|---|---|---|---|
| JP | 2014182018 | A | 9/2014 |
| WO | WO 2021166228 | A1 | 8/2021 |

OTHER PUBLICATIONS

Sato et al., "Study of Variable Management Architecture for Diverse Networks," IEICE Technical Report, Nov. 2016, 116(324):37-42, 13 pages (with machine translation).

* cited by examiner

Fig. 2

| ITEM NAME (ATTRIBUTE NAME OF PRSpec) | VALUE | EXPLANATION |
|---|---|---|
| commonName | | NAME DESCRIBING APPLICATION, PURPOSE, USER, AND THE LIKE, OF PRESENT Spec IN IDENTIFIABLE FORM |
| objectId | | IDENTIFIER THAT UNIQUELY SPECIFIES PhysicalResourceSpec |
| _resourceSpecCharacteristic | (REFER TO CHARACTERISTIC INFORMATION) | ITEM THAT DETERMINES CHARACTERISTICS OF PhysicalResource. REFER TO CHARACTERISTIC INFORMATION OF APPENDIX |
| modelNumber | DEVICE TYPE | ATTRIBUTE REPRESENTING MODEL NUMBER OF PRESENT Spec |
| partNumber | | ATTRIBUTE REPRESENTING PRODUCT NUMBER OF PRESENT Spec |
| skuNumber | LAYER INFORMATION (INTEGER) | ATTRIBUTE REPRESENTING LAYER INFORMATION OF PRESENT Spec. SMALLER NUMERICAL VALUE REPRESENTS HIGHER-LAYER DEVICE |
| vendorName | | ATTRIBUTE REPRESENTING VENDOR NAME OF PRESENT Spec |
| nttSpecHierarchyInfo | | INFORMATION REGARDING INHERITANCE LAYER OF PRSpec |
| isAbstract | | ATTRIBUTE REPRESENTING WHETHER ABSTRACT Spec OR NOT |
| baseResourceSpec | | REFERENCE TO INHERITANCE SOURCE Spec |
| nttSpecType | "PD" | REPRESENT TYPE OF PRESENT PRSpec |

NETWORK MANAGEMENT APPARATUS, METHOD, AND PROGRAM

CROSS-REFERENCE TO RELATED APPLICATIONS

This application is a National Stage application under 35 U.S.C. § 371 of International Application No. PCT/JP2022/022544, having an International Filing Date of Jun. 2, 2022, the disclosure of which is considered part of the disclosure of this application, and is incorporated by reference in its entirety into this application.

TECHNICAL FIELD

Embodiments of the present invention relate to a network management device, method, and program.

BACKGROUND ART

There is a technique (see, for example, Non Patent Literature 2) of specifying a related range of an NW service related to a failure location and grasping an affected user (user) to be affected by the failure using a common method regardless of types of a physical layer and a logical layer using a technique (see, for example, Non Patent Literature 1) that is implemented by a plurality of network (NW) devices and displays a configuration of a physical layer and a configuration of a logical layer of an NW using a common method regardless of types of the NW devices and change in protocol.

For example, in a scheme of determining influence on a service according to the related art, devices connected to both ends of a network connection (NC) affected by a failure are uniformly determined as devices to be affected. The NC indicates End-End connectivity between two devices.

CITATION LIST

Non Patent Literature

Non Patent Literature 1: Masataka SATO, Kazuaki AKASHI, Shinko HORIUCHI, Tadashi KOTANI, "Study of Variable Management Architecture for Diverse Networks", IEICE Technical Report, vol. 116, no. 324, ICM2016-31, pp. 37-42, November 2016.

Non Patent Literature 2: Kimihiko FUKAMI, Kenji MURASE, Masataka SATO, Kenichi TAYAMA, "Study on Method of Identifying Service Influence Occurred by Network Fault", IEICE Technical Journal, vol. 118, no. 483, ICM2018-51, pp. 13-18, March, 2019.

SUMMARY OF INVENTION

Technical Problem

There is a case where a failure of power interruption of a network device or the entire building (which may be referred to as a power interruption failure), that is, a failure of stopping operation of electrical equipment in the building may occur as a result of a failure of a main power supply device (which may be simply referred to as a main power supply) held in the building in which the network device is accommodated, for example, a building, due to a disaster, or the like.

On the other hand, in many buildings, a standby power supply device (sometimes simply referred to as a standby power supply), for example, a power storage device is held, and there are many cases where, when a main power supply in a building has failed, the power interruption failure is once avoided by operation of the standby power supply in the same building, but the standby power supply is depleted as a result of the main power supply being not restored, that is, the power interruption failure occurs as a result of the power stored in the power storage device being depleted.

Thus, there is a certain amount of time allowance from a failure of the main power supply in the building to occurrence of a power interruption failure related to the building.

On the other hand, in the technique disclosed in Non Patent Literature 1 or 2, the operation of the standby power supply held in the building is not considered, and the device in the building in which the main power supply has failed, the NC connected to the device, and other devices connected via the NC are uniformly determined as devices that are to be affected.

However, actually the power interruption failure is avoided while the standby power supply in the building is operating, and thus, a network device related to the building in which the main power supply has failed is not necessarily affected.

The present invention has been made in view of the above circumstances, and an object thereof is to provide a network management device, a method, and a program capable of appropriately determining influence in association with a failure that has occurred.

Solution to Problem

A network management device according to an aspect of the present invention includes: a storage device that stores information indicating a connection relationship between a plurality of communication devices and a communication path in a network configuration; and a determination unit that, when power from a main power supply is no longer supplied to one of the plurality of communication devices and power from a standby power supply is no longer suppliable to the communication device, determines that a failure has occurred in the communication device and determines a communication device to be affected by the failure that has occurred as a failure influence range on the basis of the information stored in the storage device.

A network management method according to an aspect of the present invention is a method to be performed by a network management device including a storage device that stores information indicating a connection relationship between a plurality of communication devices and a communication path in a network configuration, the network management method including, by a determination unit of the network management device, when power from a main power supply is no longer supplied to one of the plurality of communication devices and power from a standby power supply is no longer suppliable to the communication device, determining that a failure has occurred in the communication device and determining a communication device to be affected by the failure that has occurred as a failure influence range on the basis of the information stored in the storage device.

Advantageous Effects of Invention

According to the present invention, it is possible to appropriately determine influence in association with a failure that has occurred in a network.

BRIEF DESCRIPTION OF DRAWINGS

FIG. 2 is a table indicating an example of definition of network facility information in a tabular form.

DESCRIPTION OF EMBODIMENTS

Hereinafter, an embodiment according to the present invention will be described with reference to the drawings.

First Embodiment

First, a first embodiment of the present invention will be described. The first embodiment will be described assuming that, when a failure that has occurred in a physical layer of a network is a power interruption failure of a building in which a network device is accommodated, a failure of a main power supply in the building is regarded as occurrence of a power interruption failure without operation of a standby power supply being considered.

Figure 1:
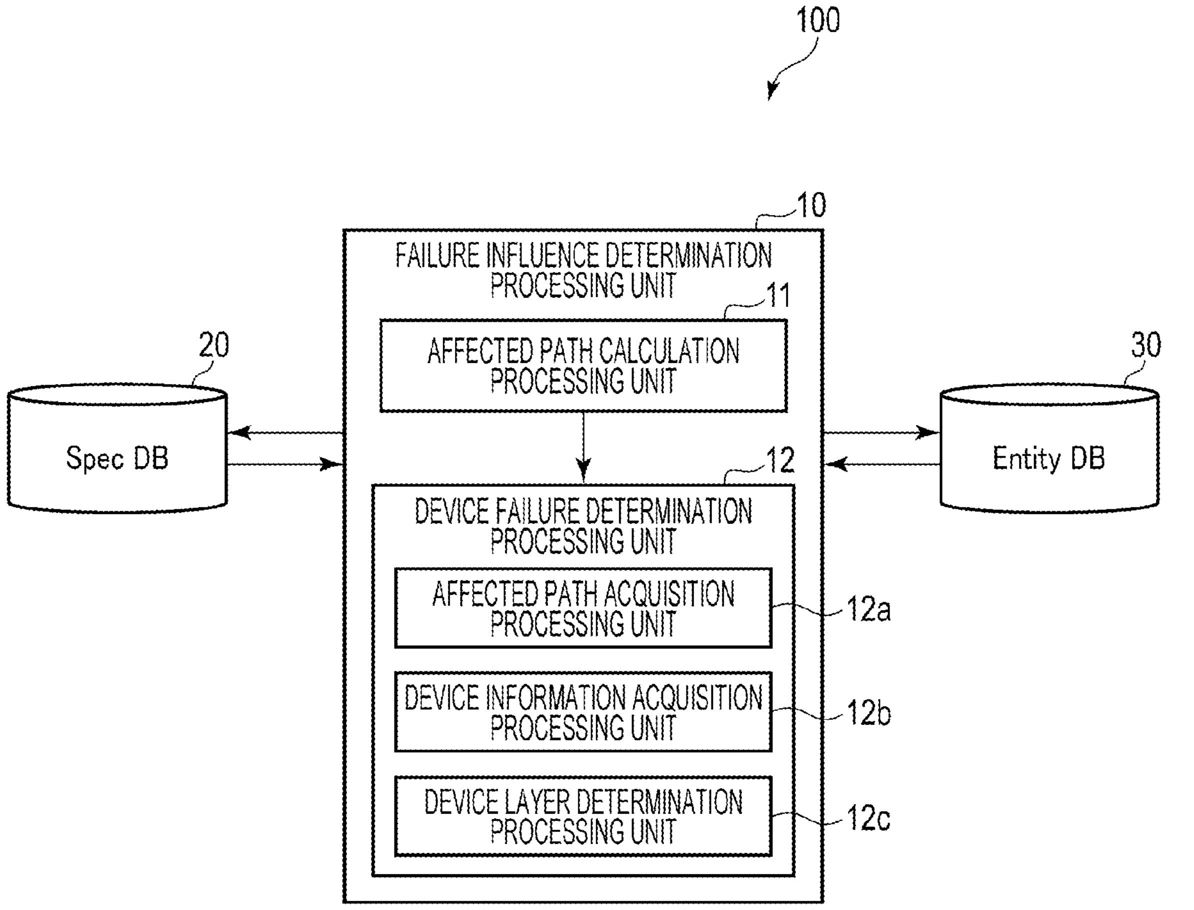
FIG. 1 illustrates an application example of a network management device according to a first embodiment of the present invention.

FIG. 1 is a view illustrating an application example of a network management device according to a first embodiment of the present invention.

As illustrated in FIG. 1, a network management device 100 according to the first embodiment of the present invention includes a failure influence determination processing unit 10, a specification (Spec) database (DB) 20, and an entity DB 30.

The failure influence determination processing unit 10 includes an affected path calculation processing unit 11 and a device failure determination processing unit 12. The device failure determination processing unit 12 includes an affected path acquisition processing unit 12*a*, a device information acquisition processing unit 12*b*, and a device layer determination processing unit 12*c*.

The Spec DB 20 stores network facility information (specification (Spec)).

The entity DB 30 stores network facility information (entity). The facility information defines (1) a relationship of each object in a physical layer, (2) a relationship of each object in a logical layer, and (3) a relationship between an object in the physical layer and an object in the logical layer.

As a configuration of the physical layer, an entity (information object) including a physical structure (PS), a physical device (PD), a physical port (PP), an aggregate section (AS), a physical link (PL), and a physical connector (PC) can be applied. Furthermore, as a configuration of the logical layer, an entity including a topological link (TL), a network forwarding domain (NFD), a termination point encapsulation (TPE), a network connection (NC), a link connect (LC), and a cross (X) connect (XC) can be applied. By such application, the configurations of the physical layer and the logical layer can be held in a unified format.

The entity name in the physical layer can be divided into the PS, PD, PP, AS, PL, and PC described above. "Entity name: meaning: correspondence" in each entity name is as follows.

- PS: accommodation building and facility such as manhole: device object
- PD: device: device object
- PP: communication port of device: port object
- AS: cable: medium object
- PL: core line of cable: medium object
- PC: connector for connecting cable: medium object The entity name in the logical layer can be divided into the TL, NED, TPE, NC, LC, and XC described above. "Entity name: meaning: correspondence" in each entity name is as follows.

- TL: connectivity between devices (in logical device layer (also referred to as LD layer)): line object
- NFD: forwardable range in device (in logical device layer): line or plane object
- TPE: end point of communication: point object
- NC: end-end connectivity (in communication layer) formed by link connect (LC) and cross (X) connect (XC): communication object
- LC: connectivity between devices (in communication layer): line or plane object
- XC: connectivity in device (in communication layer): line or plane object Next, the Spec (physical layer) of the facility information will be described. In the physical layer, an attribute that is unique information such as device name or a cable type is held in the Spec DB 20 as information in which a specification (Spec) class (defining an attribute indicating characteristics) is instantiated. Specifically, the following Spec classes are defined.

"Spec name: meaning" in the Spec class in the physical layer is as described below.

Physical structure specification (PS Spec): unique attribute is defined for each PS Physical device specification (PD Spec): unique attribute is defined for each PD Physical port specification (PP Spec): unique attribute is defined for each PP Aggregate section specification (AS Spec): unique attribute is defined for each AS Physical link specification (PL Spec): unique attribute is defined for each PL Physical connector specification (PC Spec): unique attribute is defined for each PC Next, the Spec (logical layer) of the facility information will be described.

In the logical layer, an attribute (VLAN ID, IP address, wavelength number, and the like) unique to each layer is held in the Spec DB 20 as information in which each Spec class is instantiated. Specifically, the following Spec classes are defined.

"Spec name: meaning" in the Spec class in the logical layer is as described below.

Topological link specification (TL Spec): unique attribute is defined for each TL Network forwarding domain specification (NFD Spec): unique attribute is defined for each NFD Termination point encapsulation specification (TPE Spec): unique attribute is defined for each TPE Network connection specification (NC Spec): unique attribute is defined for each NC Link connect specification (LC Spec): unique attribute is defined for each LC Cross (X) connect specification (XC Spec): unique attribute is defined for each XC Furthermore, regarding the attribute common to the layers and the value thereof, information in which the entity class is instantiated is held in the entity DB 30.

FIG. 2 is a table indicating an example of definition of network facility information in a tabular form.

The item name and a value of the facility information to be stored in the Spec DB 20 are defined as indicated in FIG. 2.

In the example indicated in FIG. 2, an attribute indicating the layer information (skuNumber) of a plurality of devices (PD) in the same communication path is defined.

The device layer information can be arbitrarily added and corrected by a user.

In the layer information, it is defined that a device with a smaller numerical value is a device in a higher layer (hereinafter, it may be referred to as a higher-layer device), and a device with a greater numerical value is a device in a lower layer (hereinafter, it may be referred to as a lower-layer device). In other words, the network facility information in the present embodiment includes layer information of a plurality of communication devices that can communicate via a communication path.

In the present embodiment, logic in which only a lower-layer device among devices corresponding to both ends of the NC is affected by occurrence of a failure and a higher-level device is not affected while the layer information of the device is taken into consideration, is integrally implemented regardless of the service and the NW configuration.

This results in more accurate calculation of influence due to occurrence of a failure in a configuration in which there is a high-layer and low-layer relationship between devices corresponding to both ends of the NC, which reduces work of grasping the influence in monitoring and maintenance work and achieves speeding up of restoration at the time of disaster.

Figure 3:
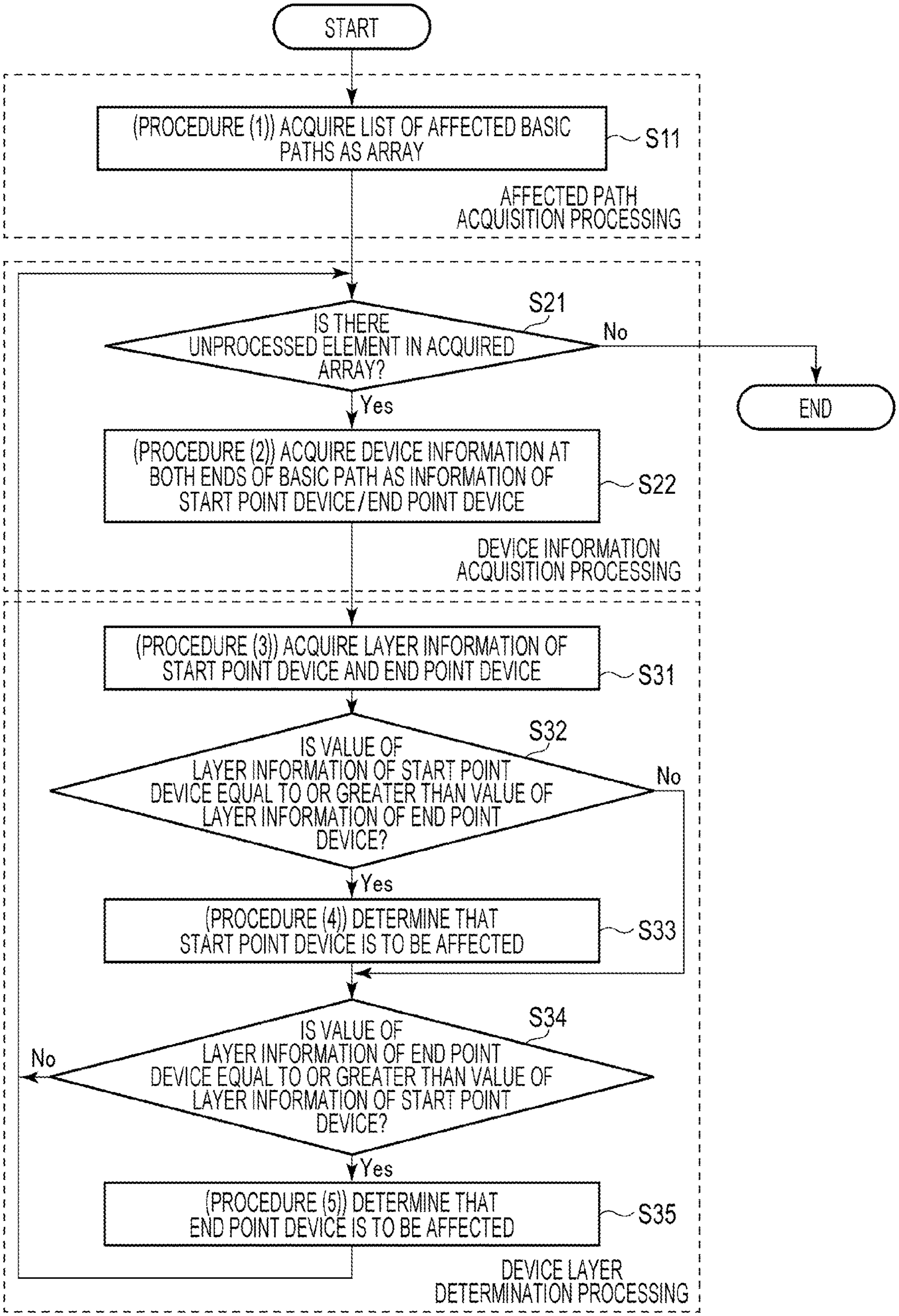
FIG. 3 is a flowchart indicating an example of processing operation by the network management device according to the first embodiment of the present invention.

FIG. 3 is a flowchart indicating an example of processing operation by the network management device according to the first embodiment of the present invention.

Prior to the processing indicated in FIG. 3, the affected path calculation processing unit 11 of the failure influence determination processing unit 10 calculates an object in the logical layer corresponding to an object related to a failure occurrence location in the physical layer as a basic path to be affected by the failure on the basis of the facility information stored in the entity DB 30. Here, when a failure (failure) has occurred in one device in the physical layer, a plurality of NCs corresponding to this device on the logical layer is calculated as the basic paths to be affected by the failure. Hereinafter, description will be given on the assumption that the device and the NC corresponding to the device on the logical layer have a connection relationship.

Next, as affected path acquisition processing, the following S11 is executed. The affected path acquisition processing unit 12*a* acquires a list of the calculated basic paths to be affected by the failure from the network facility information as an array (S11).

Next, the following S21 and S22 are executed as the device acquisition processing. If there is an unprocessed element in the subsequent processing among the respective NCs which are elements of the array acquired in S11 (S21: Yes), the device information acquisition processing unit 12*b* acquires a device connected to one end of the basic path, which is one of the unprocessed elements, from the network facility information as information of a start point device and acquires information of a device connected to the other end of the basic path from the network facility information as information of an end point device (S22).

Next, as the device layer determination processing, the following S31 to S35 are executed. The device layer determination processing unit 12*c* acquires layer information of the start point device and layer information of the end point device indicated by the information acquired in S22 from the network facility information (S31).

If the value of the layer information of the start point device is equal to or greater than the value of the layer information of the end point device (S32: Yes), the device layer determination processing unit 12*c* determines that the start point device indicated by the information acquired in S22 is a device to be affected by the occurrence of the failure (S33).

If the value of the layer information of the end point device is equal to or greater than the value of the layer information of the start point device (S34: Yes) when the determination result in S32 is No or after S33, the device layer determination processing unit 12*c* determines that the end point device indicated by the information acquired in S22 is a device to be affected by the occurrence of the failure (S35).

When a determination result in S34 is No or after S35, the processing returns to S21. Then, if there is another unprocessed element after S22, the processing after S22 is performed on the NC which is this element.

When a determination result in S21 is No, that is, when the processing after S22 is performed on all the elements of the array acquired in S11, a series of processing ends.

Figure 4:
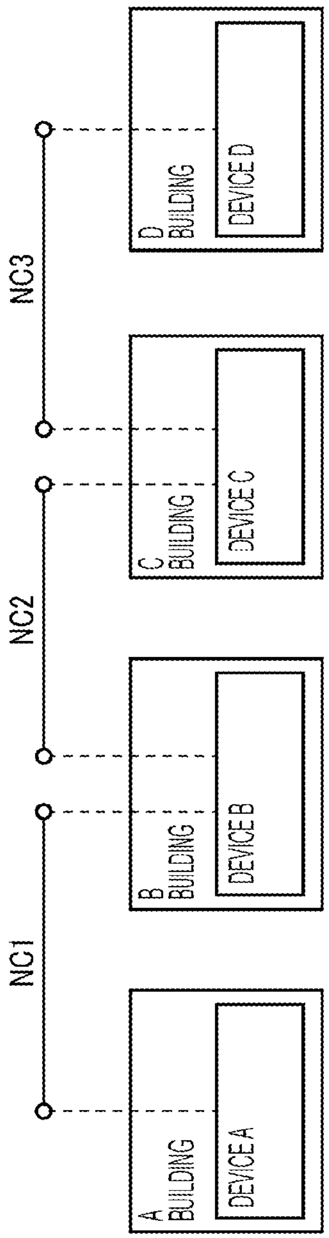
FIG. 4 is a view illustrating an example of a connection relationship between devices and a communication path.

Next, an example of processing for a specific configuration will be described. FIG. 4 is a view illustrating an example of a connection relationship between devices and a communication path.

Here, as illustrated in FIG. 4, it is assumed that a device A accommodated in a building "building A", a device B accommodated in a building "building B", a device C accommodated in a building "building", and a device D accommodated in a building "building D" are provided.

It is further assumed that one end of an object NC1 of the logical layer is connected to the device A, the device B is connected to the other end of the object NC1, one end of an object NC2 of the logical layer is connected to the device B, the device C is connected to the other end of the object NC2, one end of an object NC3 of the logical layer is connected to the device C, and the device D is connected to the other end of the object NC3.

Figure 5:
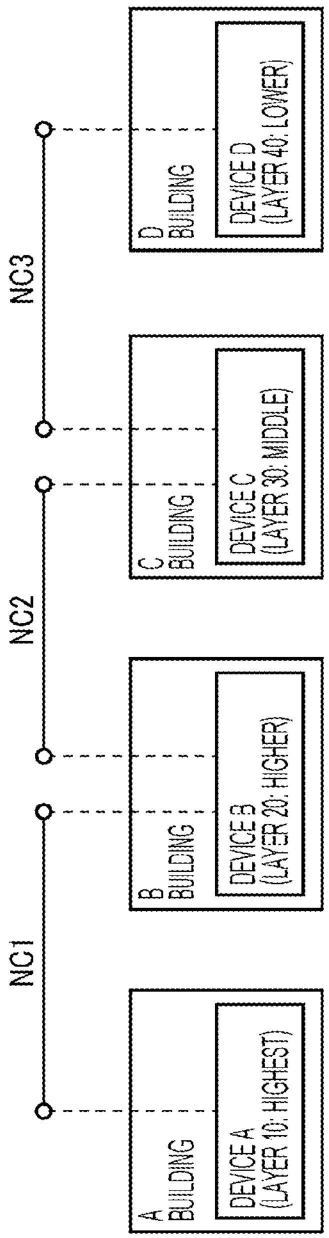
FIG. 5 is a view illustrating an example of layer information in each device.

FIG. 5 is a view illustrating an example of the layer information in each device. As illustrated in FIG. 5, in the above configuration, a value of the layer information of each device is defined as follows.

Device A: 10

·Device B: 20

·Device C: 30

·Device D: 40

In other words, the layer information indicates that the device A is a device in the highest layer, the device B is a device in the higher layer, the device C is a device in the middle layer, and the device D is a device in the lowest layer.

In S11, affected path acquisition processing due to a failure of the device B is performed, and an affected path that is a list of basic paths to be affected by the failure is acquired as an array.

Affected path: NC2, NC1

Figure 6:
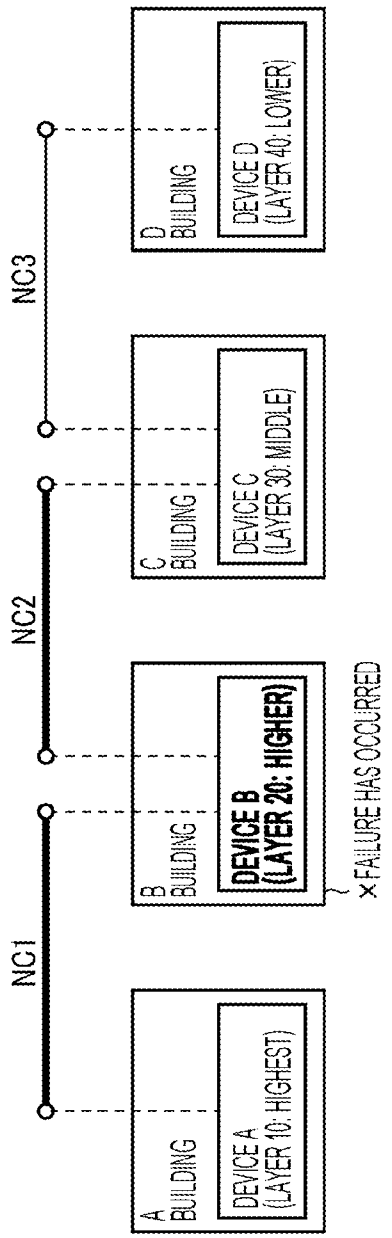
FIG. 6 is a view illustrating an example of an affected path.

FIG. 6 is a view illustrating an example of the affected path. The device B indicated by a thick line in FIG. 6 corresponds to the device in which the failure has occurred, and NC1 and NC2 indicated by a thick line correspond to the affected path.

In S22, the start point device and the end point device are acquired as follows for the first affected path NC2.

Start point device: device B

End point device: device C

In S31, a value of the layer information of the start point device and a value of the layer information of the end point device are acquired as follows.

Start point device: device B (layer information: 20)

End point device: device C (layer information: 30)

The value "20" of the layer information of the device B that is the start point device is not equal to or greater than the value "30" of the layer information of the device C that is the end point device (S32: No), and thus, the processing proceeds to S34.

The value "30" of the layer information of the device C, which is the end point device, is equal to or greater than the value "20" of the layer information of the device B, which is the start point device (S34: Yes), and thus, the device C, which is the end point device, is determined as a device to be affected by the failure in S35.

Figure 7:
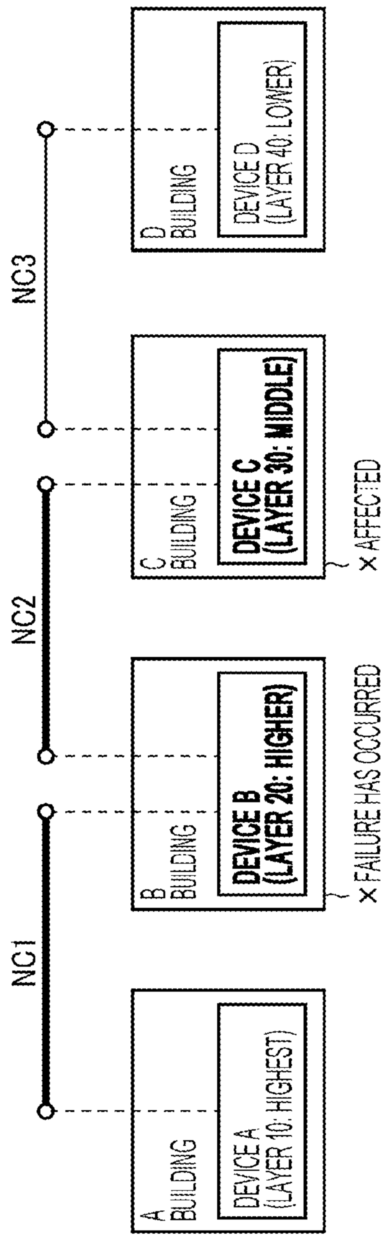
FIG. 7 is a view illustrating an example of a device to be affected by a failure.

FIG. 7 is a view illustrating an example of a device to be affected by a failure. A device C indicated by a thick line in FIG. 7 corresponds to a device to be affected by a failure.

The processing after S22 is also performed for the NC1 that is the remaining NC acquired in S11.

As a result of this processing, the device B connected to the NC1 is determined to be a device to be affected by the failure.

The device B is the device itself in which the failure has occurred, and thus, the other device C determined to be affected is the final determination result of the device to be affected by the failure that has occurred in the device B. In addition, the other devices A and D are determined as devices not to be affected by the failure.

In other words, the failure occurrence location and whether or not the devices A, B, C and D are to be affected by the failure are as follows.

Device A: not affected by failure

Device B: failure has occurred

Device C: affected by failure

Device D: not affected by failure

Figure 8:
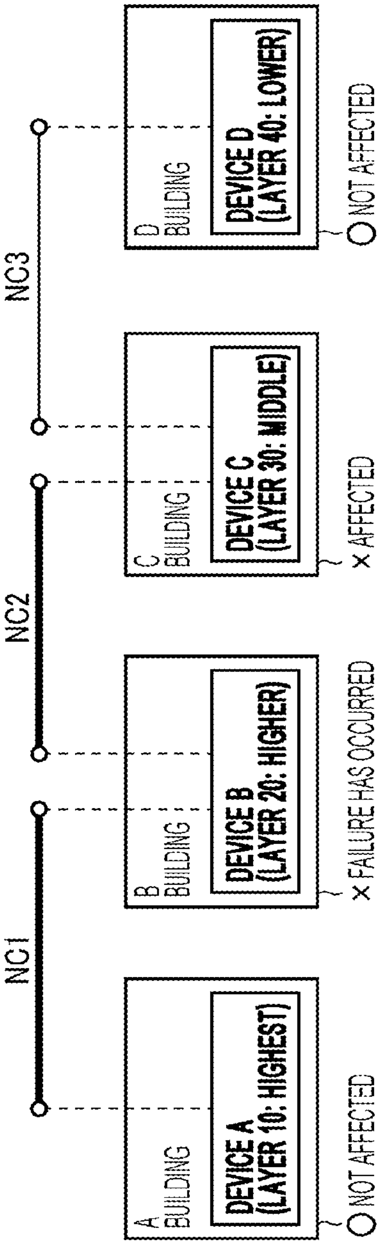
FIG. 8 is a view illustrating an example of a determination result of influence in association with a failure.

FIG. 8 is a view illustrating an example of a determination result of influence in association with the failure. As described above, FIG. 8 illustrates that whether or not the devices A, B, C and D are to be affected by the failure is determined.

Second Embodiment

Next, a second embodiment will be described. The second embodiment will be described assuming that the above-described case is a case where the main power supply in the building has failed, and operation of a standby power supply in association with the failure is not considered. In this embodiment, detailed description of the same components as those of the first embodiment is not made herein.

Figure 9:
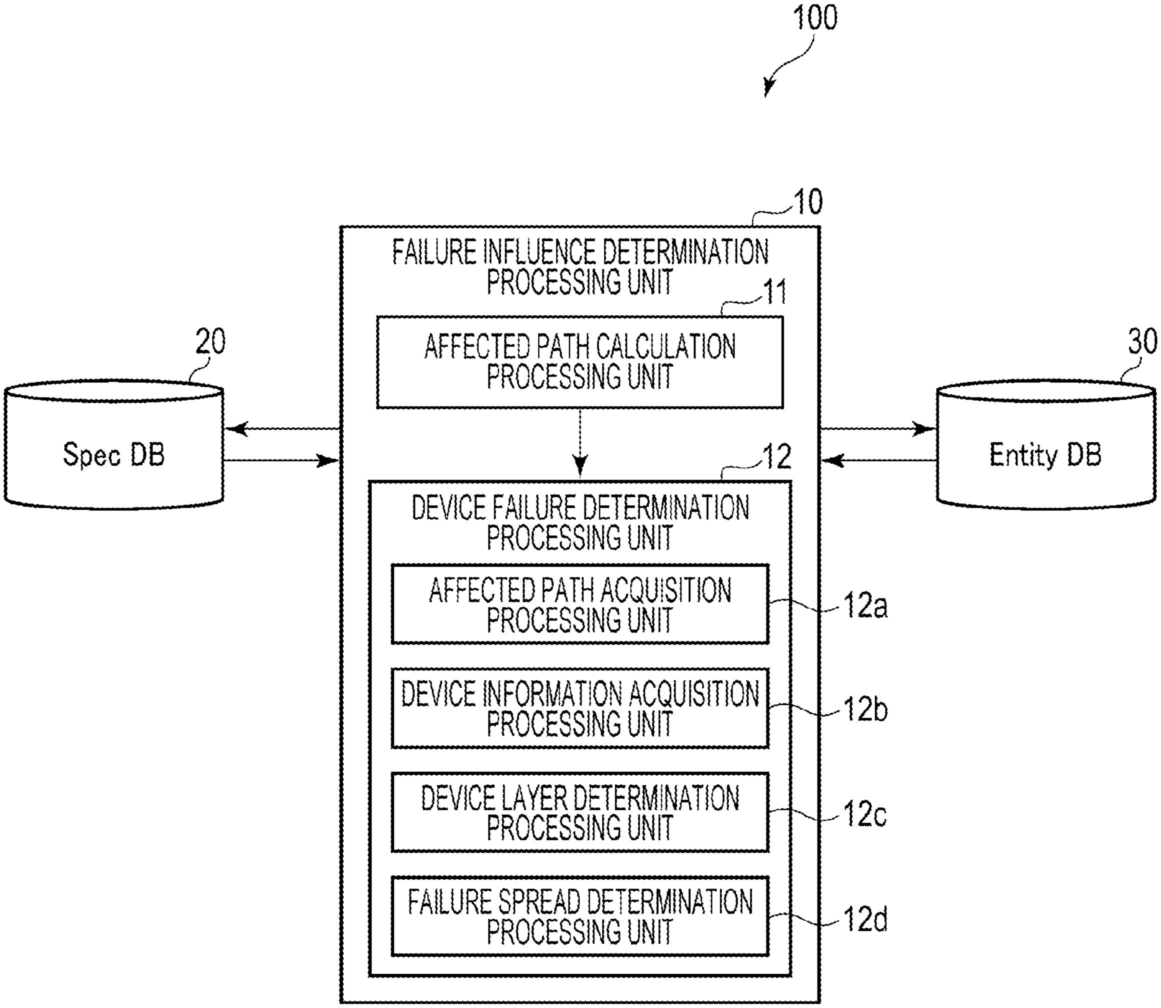
FIG. 9 is a view illustrating an application example of a network management device according to a second embodiment of the present invention.

FIG. 9 is a view illustrating an application example of the network management device according to the second embodiment of the present invention.

As illustrated in FIG. 9, in the network management device 100 according to the second embodiment of the present invention, the device failure determination processing unit 12 of the failure influence determination processing unit 10 further includes a failure spread determination processing unit **12*d***, as compared with the configuration described in the first embodiment.

In the second embodiment, logic in which, when a device that is determined in the first embodiment to be affected by a failure is further connected to a lower-layer or equivalent-layer device, it is determined that the connected device is also affected by the failure while the layer information of the device is considered, is integrally implemented regardless of the service and the NW configuration.

This results in more accurate determination of influence in association with occurrence of the failure in the configuration in which another device is connected to the devices connected to both ends of the NC which is the affected path, which can further reduce work of grasping influence in the monitoring and maintenance work.

In the second embodiment, logic in which influence of the failure of the higher-layer device spreads to the lower-layer device is implemented, so that it is possible to determine that a device that is not directly connected to the device in which the failure has occurred is also to be affected by the failure.

Figure 10:
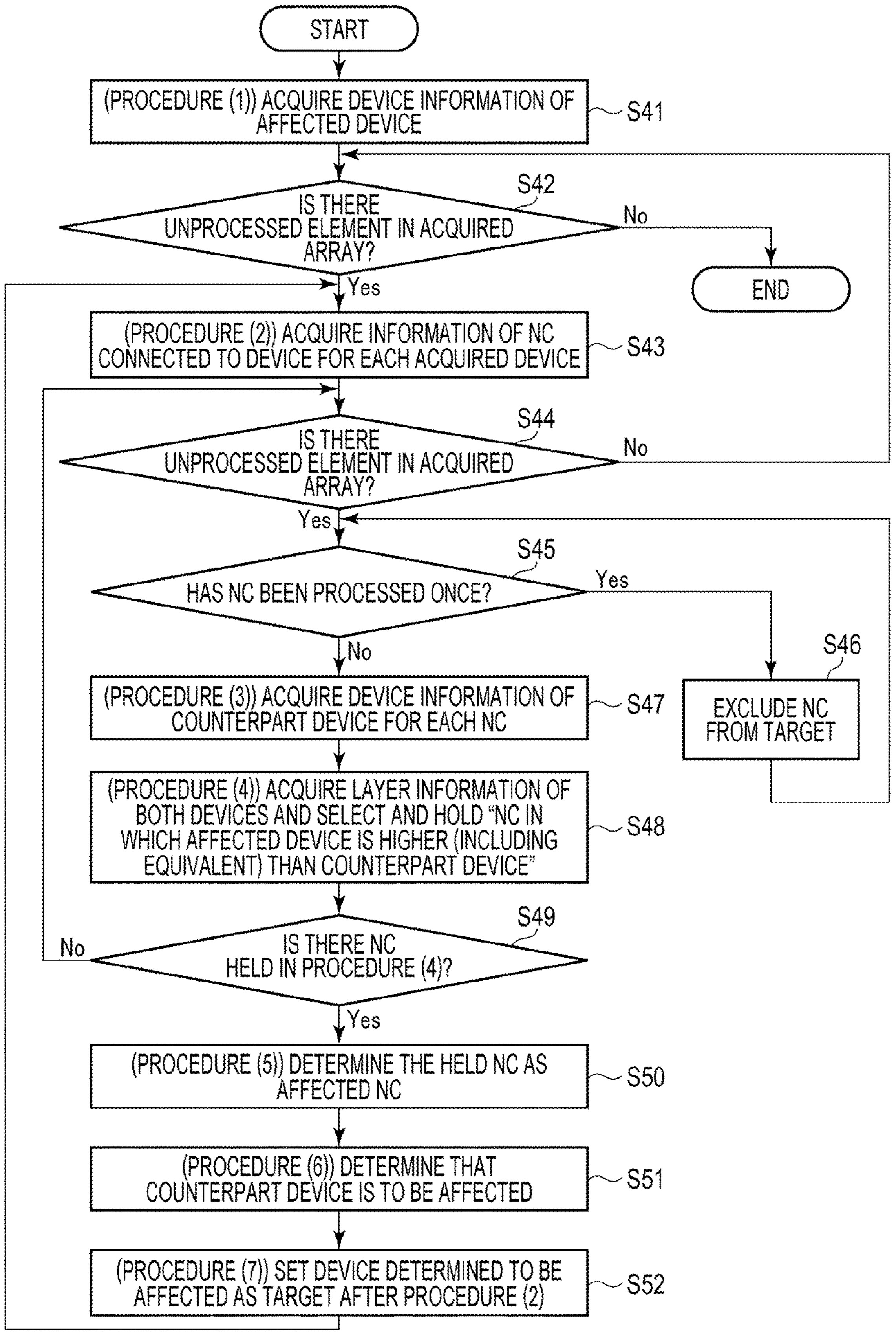
FIG. 10 is a flowchart indicating an example of processing operation by a failure spread determination unit of the network management device according to the second embodiment of the present invention.

FIG. 10 is a flowchart indicating an example of processing operation by the failure spread determination unit of the network management device according to the second embodiment of the present invention.

After the processing described in the first embodiment, the failure spread determination processing unit **12*d* acquires information on the device in which the failure has occurred and the device determined to be affected by the failure from the network facility information (S41**).

If there is an unprocessed element in the subsequent processing among the devices that are the elements of the array indicated by the acquired information (S42: Yes), the failure spread determination processing unit 12*d* acquires the information on the NC connected to the device in the array from the network facility information for each device corresponding to the element (S43).

If there is an unprocessed element in the NC which is the element of the array indicated by the information acquired in S43 in the subsequent processing (S44: Yes), the NC which has been processed once after S47 among the NCs indicated by the information acquired in S43 is excluded from the target of the subsequent processing (S45→S46), and the processing returns to S45.

For NCs other than the NCs processed in the NCs indicated by the information acquired in S43, the failure spread determination processing unit 12*d* acquires information of a counterpart device connected to the NC for each NC (S47). The counterpart device is a device connected to the other end of the NC indicated by the information acquired in S43 when one end of the NC is connected to the device indicated by the information acquired in S41.

The failure spread determination processing unit 12*d* acquires the layer information of both devices, that is, the layer information of the device indicated by the information acquired in S41 and the layer information of the counterpart device of this device, and if there is an "NC to which these devices are connected when the affected device is higher (including equivalent) than the counterpart device", selects this NC from the NCs indicated by the information acquired in S43 and holds information indicating this NC in an internal memory (S48).

When there is the NC held in S48 (S49: yes), the failure spread determination processing unit 12*d* determines that the NC held in S48 is the NC affected by the failure (S50).

Then, the failure spread determination processing unit 12*d* newly determines that the counterpart device connected to the NC is a device to be affected by the failure (S51).

The failure spread determination processing unit 12*d* sets the device determined to be affected in S51 as the target of processing after S43 (S52), and the processing returns to S43. The processing after S43 is performed on the set device.

Figure 11:
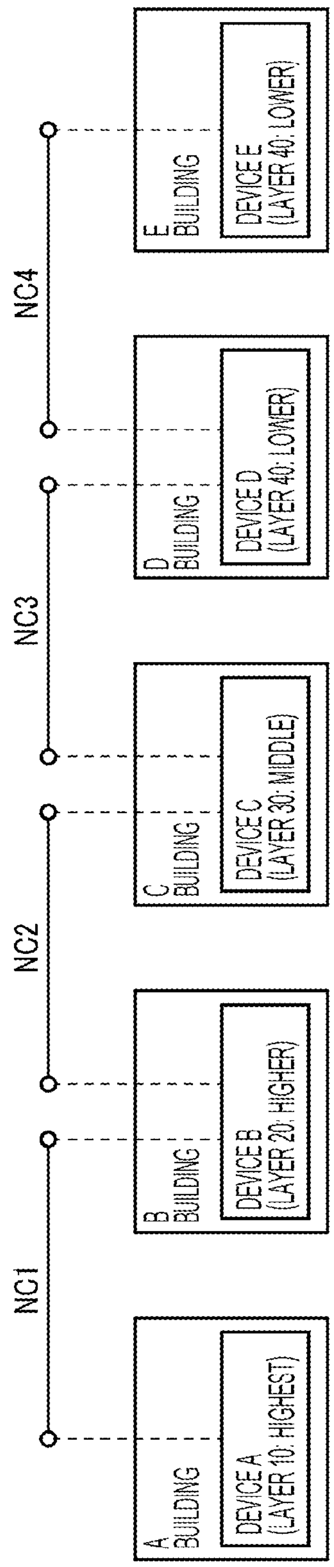
FIG. 11 is a view illustrating an example of a connection relationship between devices and a communication path.

Next, an example of processing for a specific configuration will be described. FIG. 11 is a view illustrating an example of a connection relationship between devices and a communication path.

As illustrated in FIG. 11, in the second embodiment, it is assumed that a device E accommodated in a building "building E" is provided in addition to the devices A to D described in the first embodiment.

It is further assumed that the device A, NC1, the device B, NC2, the device C, NC3, and the device D are connected as described in the first embodiment, one end of an object NC4 of the logical layer is connected to the device D, and the device E is connected to the other end of the object NC4.

In addition, it is assumed that the values of the layer information of the devices A to D are the same as the values described in the first embodiment, and a value of the layer information of the device E is 40, which is the same as the value of the layer information of the device D.

In this configuration, through the respective kinds of processing described in the first embodiment, the failure occurrence location and whether or not the devices A, B, C, D, and E are to be affected by the failure are determined as follows.

Figure 12:
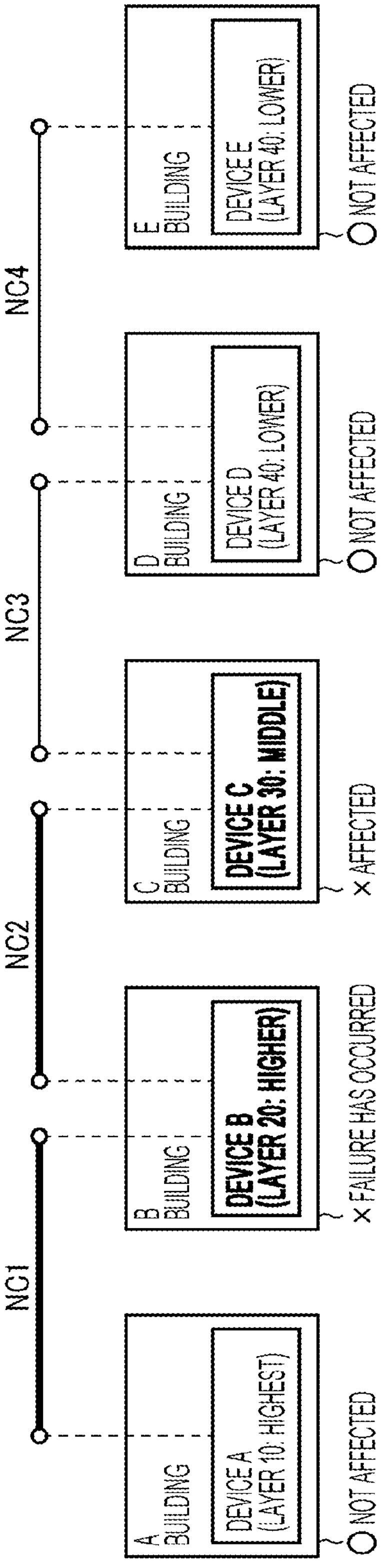
FIG. 12 is a view illustrating an example of a device to be affected by a failure.

Device A: not affected by failure
Device B: failure has occurred
Device C: affected by failure
Devices D, E: not affected by failure FIG. 12 is a view illustrating an example of a device to be affected by a failure. The device B indicated by a thick line in FIG. 12 corresponds to a device in which a failure has occurred, and the device C indicated by a thick line in FIG. 12 corresponds to a device that is determined to be affected by the failure in the first embodiment.

In S41, the failure spread determination processing unit 12*d* acquires information on the device in which the failure has occurred and information on the device determined to be affected by the failure as follows.

Device in which failure has occurred: device B
Device to be affected by failure: device C In S43, the failure spread determination processing unit 12*d* acquires, for each device indicated by the acquired information, information indicating the NC connected to the device.

Here, processing related to the device C will be described as an example.

In S43, the failure spread determination processing unit 12*d* acquires information indicating NC2 and NC3 which are NCs connected to the device C indicated by the information acquired in S41.

In S47, the failure spread determination processing unit 12*d* acquires information indicating the device B that is the counterpart device via the NC2 indicated by the information acquired in S43 as viewed from the device C that is the first device indicated by the information acquired in S41.

Similarly, in S47, the failure spread determination processing unit 12*d* acquires information indicating the device D that is the counterpart device via the NC3 indicated by the information acquired in S43 as viewed from the device C that is the second device indicated by the information acquired in S41.

In S48, the failure spread determination processing unit 12*d* compares a value 30 of the layer information of the device C indicated by the information acquired in S41 with a value 20 of the layer information of the counterpart device B via the NC2 indicated by the information acquired in S43 as viewed from the device C, and the device C to be affected by the failure is in a lower layer than the layer of the counterpart device B, and thus, the information indicating the NC2 is not held in S48.

On the other hand, when the failure spread determination processing unit 12*d* compares the value 30 of the layer information of the device C indicated by the information acquired in S41 with a value 40 of the layer information of the counterpart device D via the NC3 indicated by the information acquired in S43 as viewed from the device C, the device C to be affected by the failure is in a higher layer than the layer of the counterpart device D, and thus, the information indicating the NC3 is held in S48.

Figure 13:
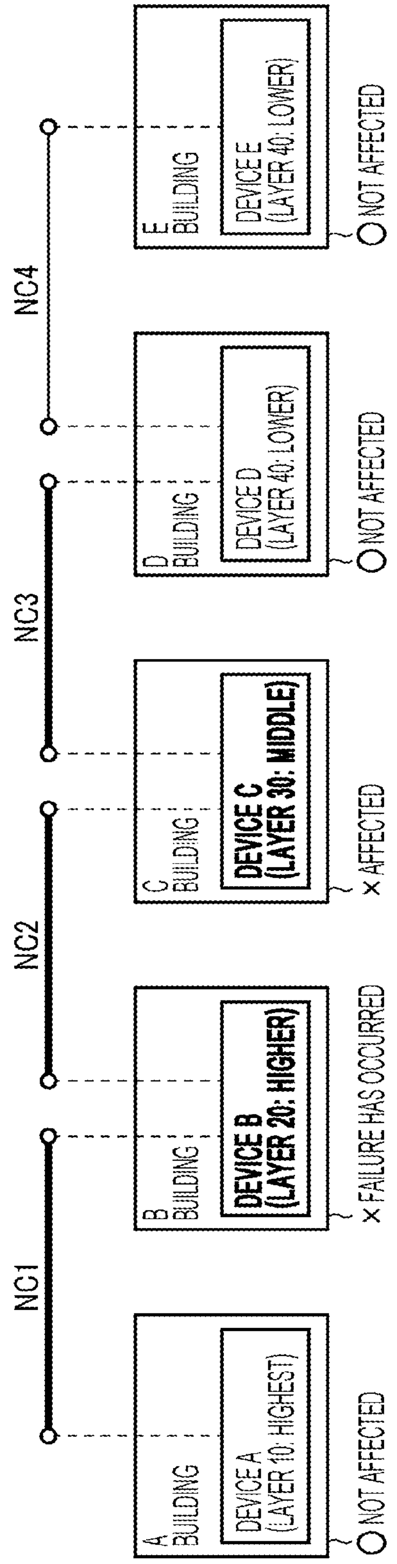
FIG. 13 is a view illustrating an example of a communication path to which influence in association with a failure has been spread.

In S50, the failure spread determination processing unit 12*d* determines that the NC3 indicated by the information held in S48 is the NC to be affected by the failure. FIG. 13 is a view illustrating an example of a communication path to be affected by the failure. In FIG. 13, the NC3, which is the NC affected by the failure, is indicated by a thick line.

Figure 14:
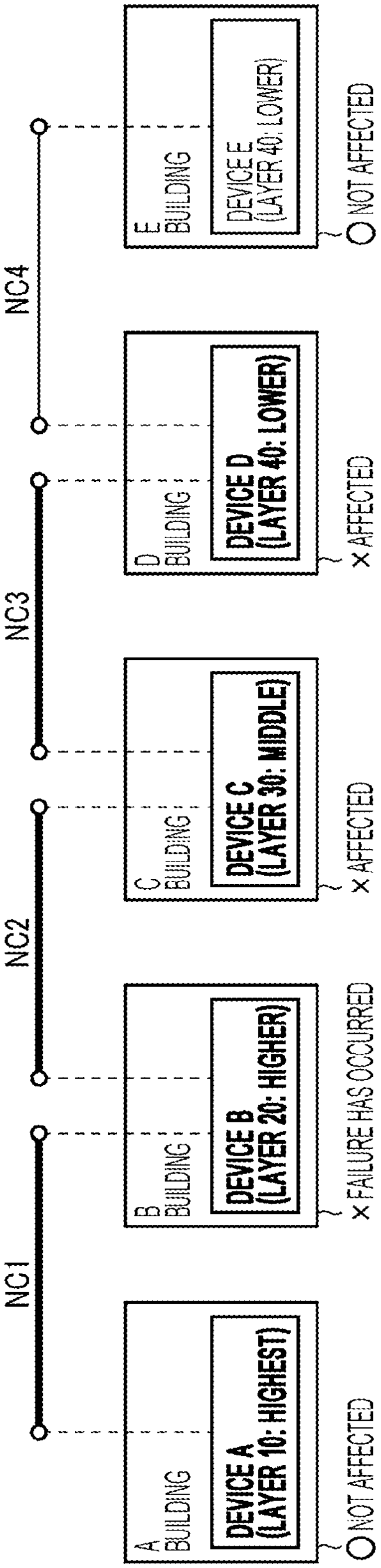
FIG. 14 is a view illustrating an example of a device to be affected by a failure.

In S51, the failure spread determination processing unit 12*d* determines that the device D that is the counterpart device via the NC3 indicated by the information held in S48 as viewed from the device C indicated by the information acquired in S41 is a device to be affected by the failure. FIG. 14 is a view illustrating an example of the device to be affected by the failure. In FIG. 14, the device D to be affected by the failure is indicated by a thick line.

In S52, the failure spread determination processing unit 12*d* sets the device D determined to be affected by the failure in S48 as the target of processing after S43.

With this setting, in S43, the failure spread determination processing unit 12*d* acquires information indicating the NC3 and the NC4 connected to the device D set in S48.

In the determination in S45, the NC3 which is the first NC among the NCs indicated by the information acquired in S43 is the NC subjected to the processing after S47, and thus is not the target of the subsequent processing. On the other hand, the NC4, which is the second NC indicated by the information acquired in S43, is not the NC subjected to the processing after S47. Thus, in S47, the failure spread determination processing unit 12*d* acquires information indicating the device E that is the counterpart device via the NC4 indicated by the information acquired in S43 as viewed from the device D set in S52.

The value 40 of the layer information of the counterpart device E via NC4 indicated by the information acquired in S43 as viewed from the device D is the same as the value 40 of the layer information of the device D set in S52. In other words, the device D is in the same layer as the counterpart device E, and thus, the failure spread determination processing unit 12*d* holds the information indicating the NC4 in S48.

In S50, the failure spread determination processing unit 12*d* determines that the NC4 indicated by the information held in S48 is the device to be affected by the failure.

In S51, the failure spread determination processing unit 12*d* determines the device E that is the counterpart device via the NC4 indicated by the information held in S48 as viewed from the device D set in S52 as the device to be affected by occurrence of the failure.

Figure 15:
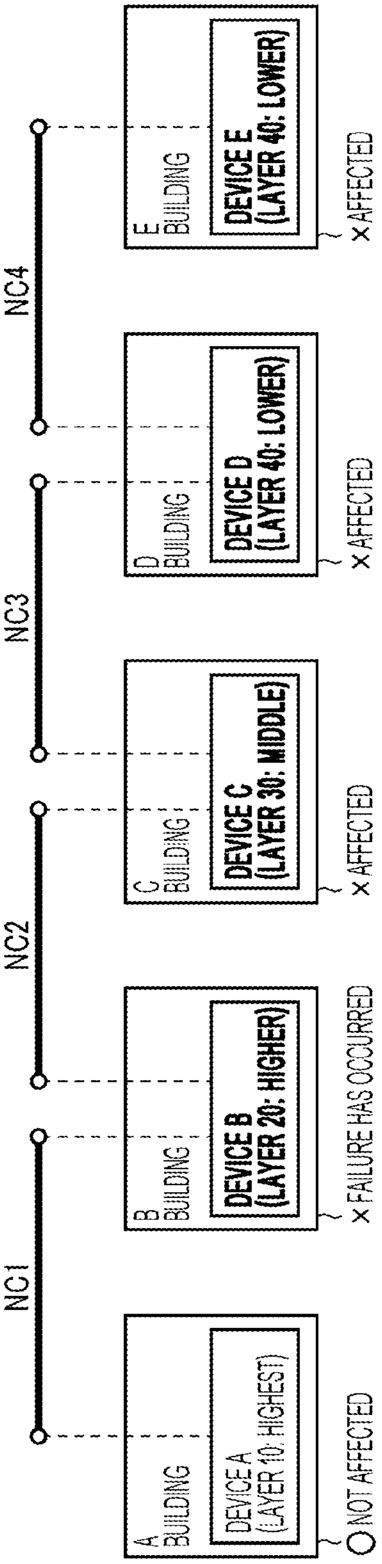
FIG. 15 is a view illustrating an example of a determination result of influence in association with a failure.

In addition, the processing after S42 is performed for all the other devices acquired in S41, here, including the device B, and thus, the final determination result of influence in association with the failure is as follows. FIG. 15 is a view illustrating an example of a determination result of influence in association with the failure. The determination result illustrated in FIG. 15 is different from that when respective kinds of processing described in the first embodiment are performed in that the devices D and E are determined as devices to be affected by the failure. In other words, as compared with the first embodiment, spread of influence to a lower-layer device is determined.

Device A: not affected by failure
Device B: failure has occurred
Devices C, D, E: affected by failure

Third Embodiment

Next, a third embodiment will be described. In this embodiment, detailed description of portions overlapping with the second embodiment will be omitted.

Figure 16:
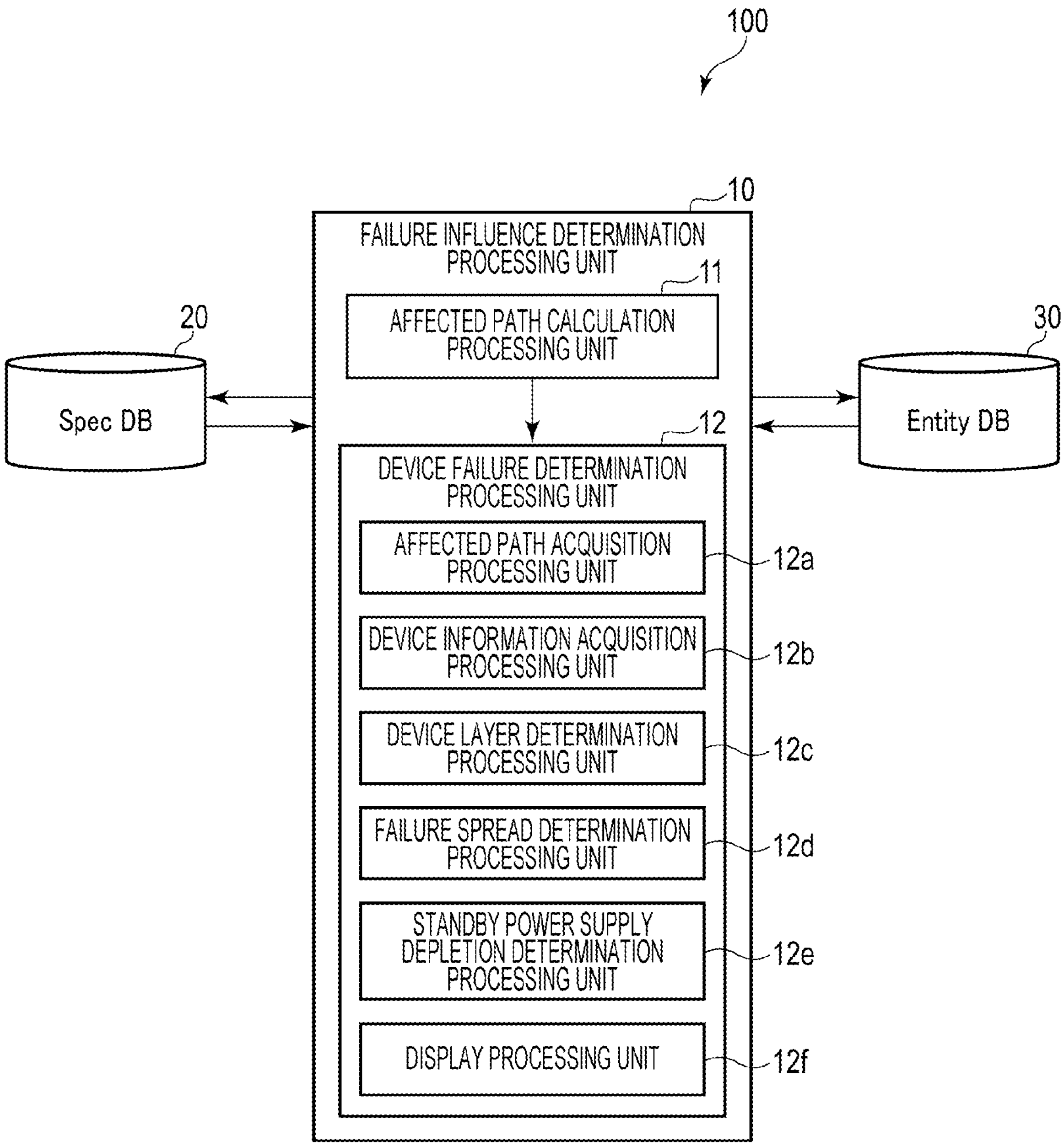
FIG. 16 is a view illustrating an application example of a network management device according to a third embodiment of the present invention.

FIG. 16 is a view illustrating an application example of the network management device according to the third embodiment of the present invention.

As illustrated in FIG. 16, in the network management device 100 according to the third embodiment of the present invention, as compared with the configuration described in the second embodiment, the device failure determination processing unit 12 of the failure influence determination processing unit 10 further includes a standby power supply depletion determination processing unit 12*e* and a display processing unit 12*f*.

In the third embodiment, operation of the standby power supply accommodated in the same building is taken into consideration when the failure that has occurred in the physical layer in the first and second embodiments is due to stop of power supply due to a failure of the main power supply accommodated in the building by damage of the building in which the network device is accommodated, or the like. With this consideration, in the third embodiment, it is possible to grasp whether or not a power interruption failure related to the building has occurred in association with lapse of time from a time point at which the main power supply has failed to a time point at which power from the standby power supply is depleted (sometimes referred to as depletion of the standby power supply).

In a simulation of service influence at the time of disaster which is generally implemented, "power interruption" is implemented as content of the failure which can be designated by a user. For example, a simulation of a power interruption failure that has occurred immediately when the main power supply in the building has failed is executed, and only influence at a fixed point of occurrence of the failure is calculated.

However, in practice, the power supply in the building can be secured for a certain period of time by operation of the standby power supply in the building, and thus, an opportunity for immediate occurrence of the power interruption failure is limited, and the simulation is different from an actual failure state.

As described above, in the simulation in related art, the operation of the standby power supply for each building is not considered, and thus, when a deployment plan of the power supply vehicle for power restoration of the building is prepared, it is necessary to separately perform manual consideration in consideration of the standby power supply.

Thus, in the third embodiment of the present invention, a depletion period until the power from the standby power supply in the building in which the main power supply has failed is depleted is used as new information in addition to information on the building in which a failure in which the main power supply has failed has occurred. This depletion period is a predicted value or a design value of a period from a timing at which the standby power supply starts to operate to a timing at which power that can be supplied from the standby power supply to the facilities in the building is depleted in a state where the main power supply is not restored.

The power that can be supplied from the standby power supply to the facilities in the building is, for example, power stored in the power storage device in the standby power supply.

As a result, in the above simulation, when it is assumed that the main power supply of the building has failed due to a disaster, or the like, according to a numerical value of the depletion period of the power from the standby power supply in the building, when it is assumed that the power from the standby power supply is supplied to the facilities in the building until the depletion period has elapsed, a status (status) indicating a state of the failure related to the building is maintained in a normal state, and when it is assumed that it is after the depletion period has elapsed, the status of the building is transitioned to a failure state, so that it is possible to grasp the failure state in association with the lapse of time since the failure of the main power supply.

In the present embodiment, it is considered that the operating power supply is switched to the standby power supply immediately after the failure of the main power supply of the building occurs. With this consideration, in the present embodiment, it is possible to perform a simulation in which the failure state changes in association with the lapse of time, that is, a simulation close to an actual failure state, in which the power interruption failure and its influence spread as the depletion period of the standby power supply for each building has elapsed, which leads to improvement in accuracy of grasping influence at the time of disaster.

In the present embodiment, spread of the power interruption failure in association with elapse of the depletion period of the standby power supply for each building is determined by the configurations described in the first and second embodiments. This makes it possible to effectively use the above simulation result when selection of a building to be preferentially restored is considered in the deployment plan of the power supply vehicle to the building.

In the simulation in related art, only the failure state at a fixed point immediately after occurrence of the failure is the target of recognition of the failure influence. On the other hand, in the present embodiment, the depletion period of the standby power supply in the building is newly used in the above simulation, and thus, a period during which the standby power supply operates instead of the main power supply in the building is considered, so that it is possible to grasp the influence in association with lapse of time.

In addition, in the present embodiment, input operation in the above simulation can be performed using a time axis as a variable, so that it is possible to grasp a state of the influence of damage due to disaster even in an arbitrary time unit designated by the user.

Figure 17:
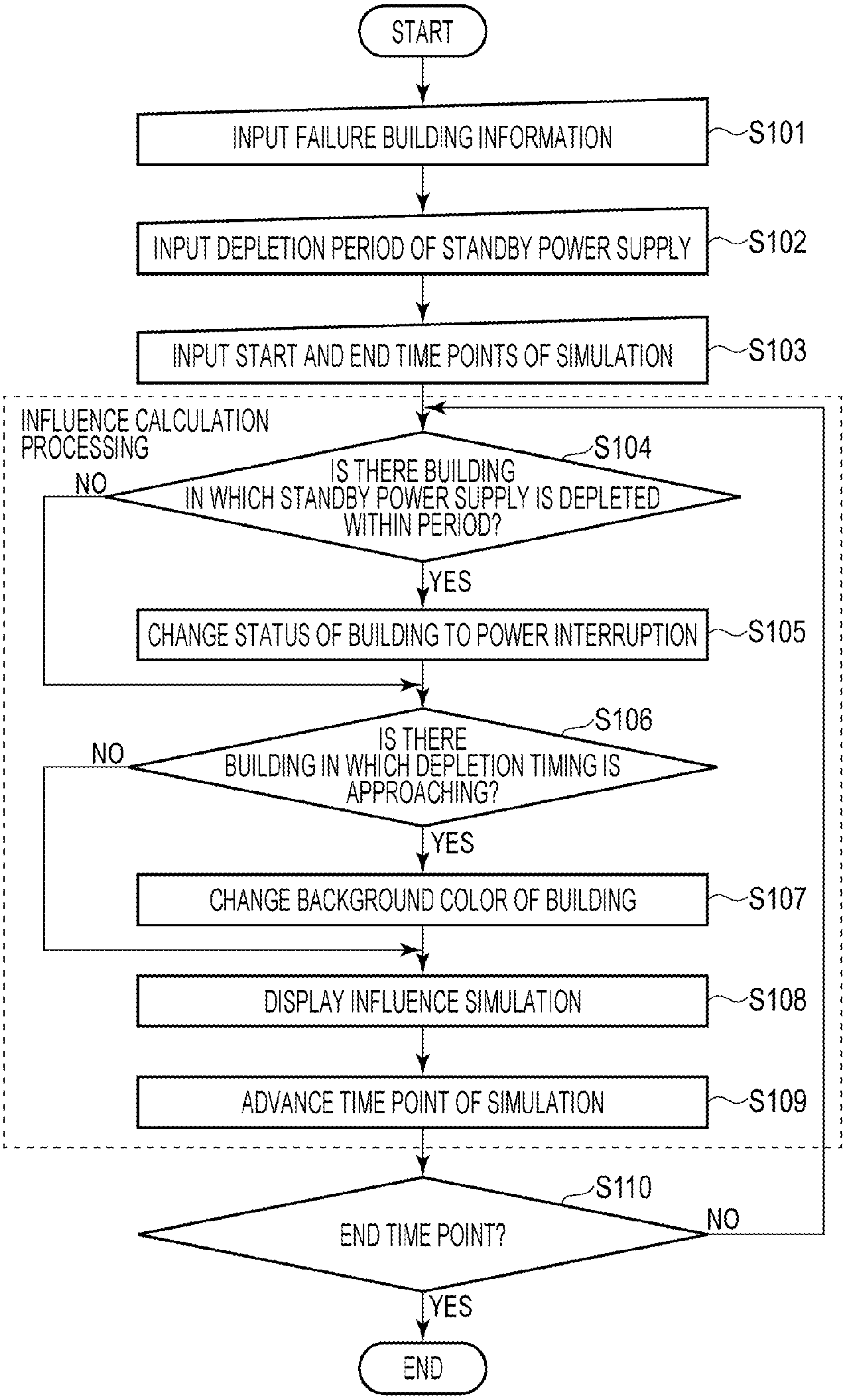
FIG. 17 is a flowchart indicating an example of processing operation by the network management device according to the third embodiment of the present invention.

FIG. 17 is a flowchart indicating an example of processing operation by the network management device according to the third embodiment of the present invention.

First, the standby power supply depletion determination processing unit 12*e* receives an input of failure building information for specifying at least one building in which the failed main power supply is accommodated, here, each of a plurality of buildings (S101). The failure building information corresponds to a building in which the failed main power supply is accommodated among the PS in which each object indicated by the facility information stored in the entity DB 30 is accommodated. The failure building information may be received by input operation by an operator or may be information generated by detecting a failure of the main power supply by a detection device (not illustrated).

The standby power supply depletion determination processing unit 12*e* receives an input of a depletion period of the standby power supply that is a period during which the standby power supply accommodated in the building indicated by the failure building information received in S101 can operate, that is, a period until power that can be supplied by the standby power supply is depleted in a state where the main power supply is not restored (S102). The depletion period of the standby power supply may be stored in the entity DB 30 in association with the facility information stored in the entity DB 30 in advance.

The standby power supply depletion determination processing unit 12*e* receives an input of a start time point and an end time point of an influence simulation which is a simulation relating to influence on operation of facilities, that is, the communication device due to the operation and depletion of the standby power supply, when it is assumed that a failure of the main power supply has occurred (S103).

Next, influence calculation processing from the following S104 to S109 will be described.

First, the standby power supply depletion determination processing unit 12*e* determines whether or not there is a building in which the standby power supply is depleted between the start time point and the end time point received in S101 among the buildings indicated by the failure building information received in S103 (S104).

In the present embodiment, information on a status indicating whether or not a power interruption failure of each building has occurred is stored in the entity DB 30 in association with, for example, the facility information stored in the entity DB 30 in advance. In an initial state, it is assumed that the status is set to "normal".

When it is determined as Yes in S104, the standby power supply depletion determination processing unit 12*e* changes and sets the status of the corresponding building, that is, the building in which the standby power supply has been depleted to "power interruption" (S105).

After S105 or when it is determined No in S104, the standby power supply depletion determination processing unit 12*e* determines whether or not there is a building in which the standby power supply is not depleted during a period from the start time point to the end time point received in S101 but a depletion timing is approaching, here, the remaining period until the timing at which the standby power supply is predicted to be depleted is equal to or less than a predetermined period, among the buildings indicated by the failure building information received in S103 (S106).

In the present embodiment, background color corresponding to the status of each building is displayed on a screen of a display device (not illustrated). It is assumed, for example, that the background color in the initial state in which the remaining period exceeds the predetermined period is colorless, and the background color when the remaining period becomes equal to or less than the predetermined period, here, when the depletion timing is approaching is red.

When it is determined as Yes in S106, the standby power supply depletion determination processing unit 12*e* changes the background color set for the corresponding building to red (S107).

After S107 or when it is determined No in S106, the display processing unit 12*f* displays a simulation result of the power interruption failure of the building and the influence of the failure on another building due to the power interruption failure on the display device on the screen on the basis of the status and the background color set for each building (S108). The display of the simulation result will be described later.

The standby power supply depletion determination processing unit 12*e* changes a current time point set in the simulation to a time point advanced by a predetermined period (S109).

The standby power supply depletion determination processing unit 12*e* determines whether or not the current time point changed in the above-described S109 reaches the end time point set in S103 (S110).

When the set current time point does not reach the end time point set in S103 (S110: No), the processing returns to S104. On the other hand, when the set current time point reaches the end time point set in S103 (S110: Yes), a series of processing by the standby power supply depletion determination processing unit 12*e* ends.

Figure 18:
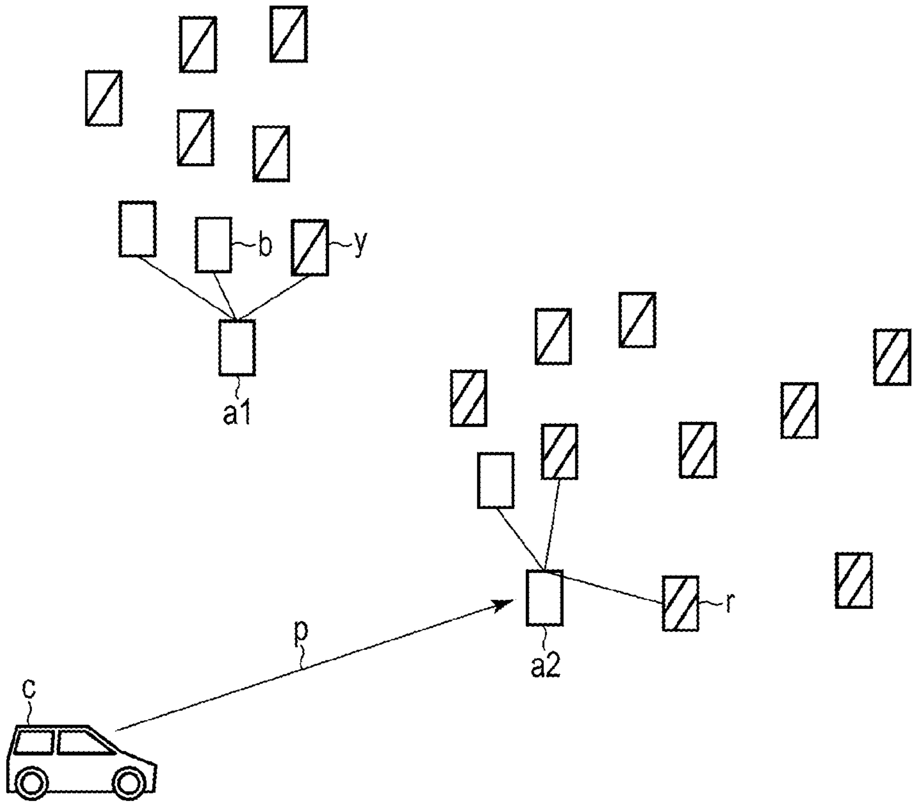
FIG. 18 is a view for explaining general power supply vehicle deployment when a main power supply has failed.

FIG. 18 is a view for explaining general power supply vehicle deployment when the main power supply has failed.

The example illustrated in FIG. 18 assumes that both the main power supply accommodated in a building a1 and the main power supply accommodated in a building a2 have failed, and a power interruption failure has occurred in each building due to this failure and indicates that the service of the operation of the facilities in the building is affected. FIG. 18 illustrates facilities in the building that are normally operating (reference sign b) and facilities whose services are affected (reference sign y (degree of influence is small) and reference sign r (degree of influence is large)). A degree of influence varies depending on, for example, importance of the service by the corresponding facility or the number of users who use the service.

In addition, in the example illustrated in FIG. 18, when a power interruption failure has occurred in both the building a1 and the building a2, the influence on the operation of the facilities in the building a2 is relatively higher than the influence on the operation of the facilities in the building a1. Thus, FIG. 18 illustrates that a power supply vehicle c for power restoration work of the building is deployed in the building a2 in preference to the building a1 (reference sign p).

When the example illustrated in FIG. 18 is displayed on the screen, it is displayed as a result of assuming that all the facilities of the building are immediately powered off when the main power supply of the building has failed. For this reason, when a plurality of buildings are damaged and the main power supplies have failed, in reality, there is a possibility that influence of the failure is displayed higher in a building in which a service is not affected yet because of operation of a standby power supply than influence of the failure in a building in which a service is affected due to depletion of power from a standby power supply.

Thus, there is a possibility that the deployment plan of the power supply vehicle may be formulated with priority different from the actual state.

Figure 19:
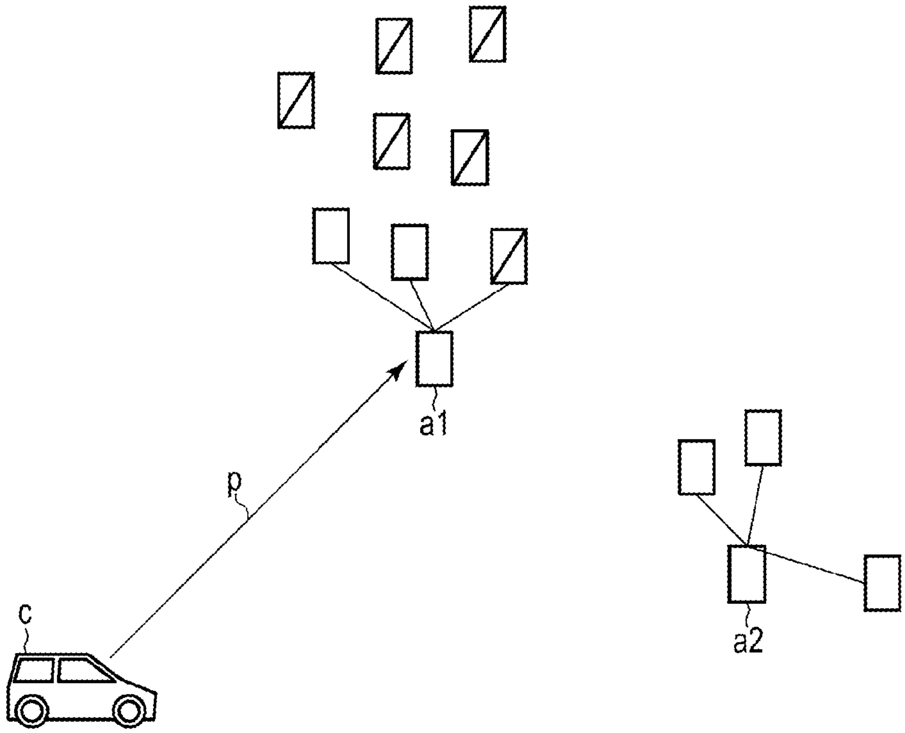
FIG. 19 is a view for explaining power supply vehicle deployment when the network management device according to the third embodiment of the present invention is applied and the main power supply has failed.

FIG. 19 is a view for explaining power supply vehicle deployment when the network management device according to the third embodiment of the present invention is applied and the main power supply has failed.

The example illustrated in FIG. 19 illustrates that the main power supply accommodated in the building a1 and the main power supply accommodated in the building a2 have both failed, the standby power supply accommodated in each building starts to operate due to the failure, and the standby power supply accommodated in the building a1 is depleted at a timing earlier than the standby power supply accommodated in the building a2, for example, at a timing when several hours have elapsed since the failure of the main power supply.

In addition, the example illustrated in FIG. 19 assumes that the power interruption failure has occurred in the building a1 at the depletion time point, and the operation of the facilities in the building is affected and indicates that the power interruption failure does not occur in the building a2 because the standby power supply accommodated in the building a2 has not been depleted and the operation is continued at this time point.

In addition, the example illustrated in FIG. 19 indicates that the operation of the facilities in the building a1 is affected, and thus, the power supply vehicle C for power restoration work of the building is deployed in the building a1 in preference to the building a2 (reference sign P) between the building a1 and the building a2.

When the example illustrated in FIG. 19 is displayed on the screen, it is possible to display a simulation result close to the actual state as a result of the operation of the standby power supply of the building being considered.

This makes it possible to perform selection to cause the power supply vehicle to preferentially restore the power supply of the building in which the standby power supply is depleted first.

Figure 20:
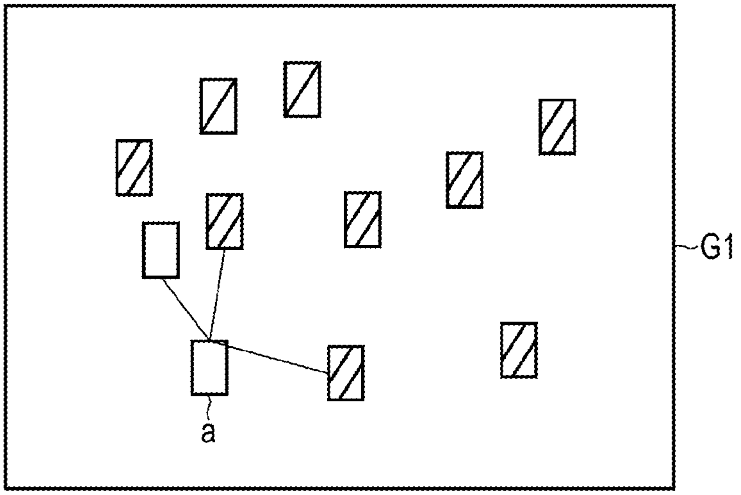
FIG. 20 is a view for explaining a screen display example related to influence when the main power supply has failed.

FIG. 20 is a view for explaining a screen display example related to influence when the main power supply has failed.

A screen G1 illustrated in FIG. 20 is a display screen of a simulation when the third embodiment of the present invention is not applied and indicates that when a main power supply accommodated in a building a has failed, for example, when "power interruption" is set, it is regarded that a power interruption failure has occurred in the building due to this failure, and the operation of facilities in the building is affected.

On the screen G1, when the failure of the main power supply of the building is set, a result of the failure of all the power supply facilities of the building is immediately displayed as the simulation result without the operation of the standby power supply of the building being considered.

Figure 21:
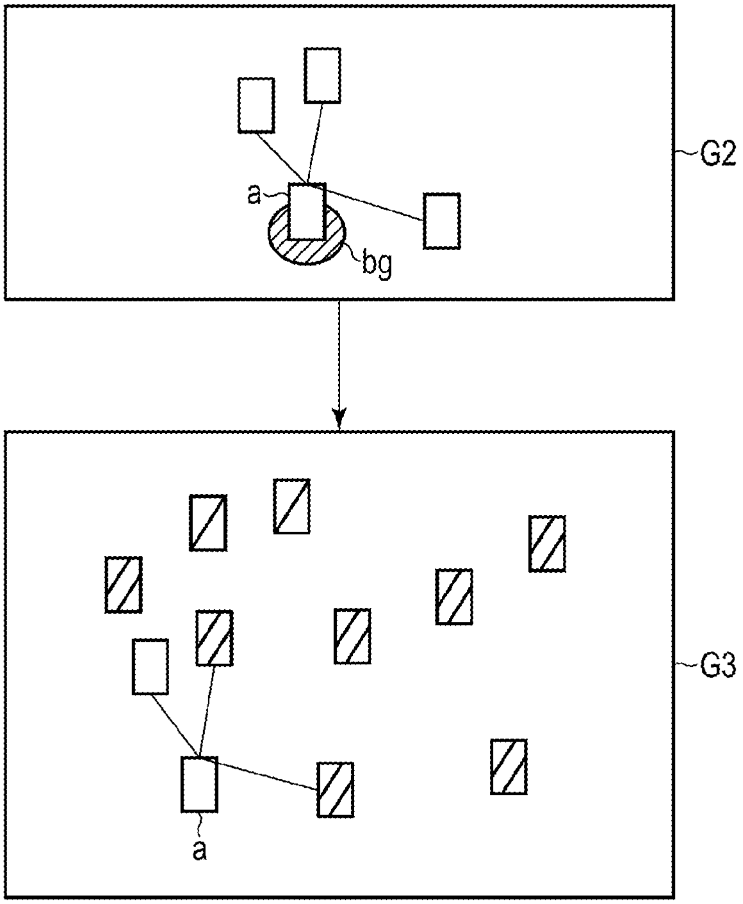
FIG. 21 is a view for explaining a screen display example related to influence when the network management device according to the third embodiment of the present invention is applied and the main power supply has failed.

FIG. 21 is a view for explaining a screen display example related to influence when the network management device according to the third embodiment of the present invention is applied and the main power supply has failed.

Screens G2 and G3 illustrated in FIG. 21 are display screens of a simulation by the display processing unit **12*f* when the third embodiment of the present invention is applied, and the screen G2** indicates that, when a period from when the operation of the standby power supply of the building has been started until the standby power supply is depleted is set in advance, and the failure of the main power supply of the building due to the disaster is set, the standby power supply operates in association with the failure, so that the power interruption failure does not occur.

In addition, the screen G2 indicates that, when it is determined in the above-described S109 that the timing at which the standby power supply that has started the above-described operation is depleted is approaching as a result of the current time point in the simulation advancing as in the above-described S106, the background color (reference sign bg) of the corresponding building on the screen changes as described in the above-described S107.

In addition, in the screen G3 illustrated in FIG. 21, the screen G2 is displayed, and it is indicated that as a result of further advancing the current time point in the simulation, a power interruption failure occurs in the building at the timing when the standby power supply that has started the operation is depleted, and the operation of the facilities in the building is affected by the occurrence.

As described above, in the third embodiment of the present invention, when power from a main power supply is no longer supplied to one of a plurality of communication devices in a network configuration and power from a standby power supply is no longer suppliable to the communication device, it is determined that a failure has occurred in the communication device, and a communication device to be affected by the failure that has occurred is determined as a failure influence range on the basis of information which is stored in a storage device and which indicates a connection relationship between the plurality of communication devices and a communication path.

It is therefore possible to appropriately determine influence of the failure in consideration of a fact that there is a time delay until the failure occurs in the communication device because of operation of the standby power supply.

Figure 22:
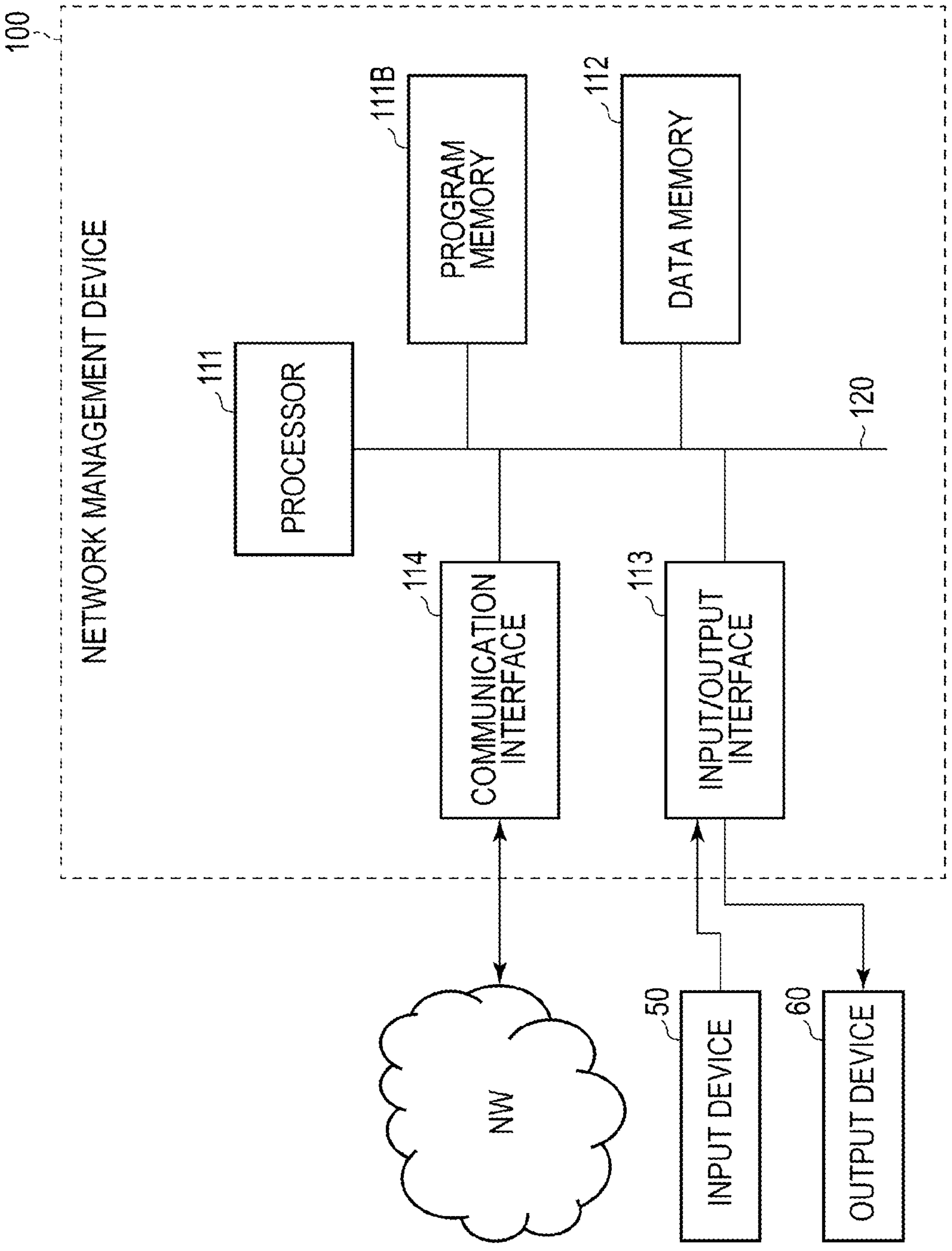
FIG. 22 is a block diagram illustrating an example of a hardware configuration of a network management device according to an embodiment of the present invention.

FIG. 22 is a block diagram illustrating an example of a hardware configuration of a network management device according to an embodiment of the present invention.

In the example illustrated in FIG. 22, the network management device 100 according to the above embodiment includes, for example, a server computer or a personal computer, and includes a hardware processor 111A such as a CPU. In addition, a program memory 111B, a data memory 112, an input/output interface 113, and a communication interface 114 are connected to the hardware processor 111A via a bus 120.

The communication interface 114 includes, for example, one or more wireless communication interface units and enables transmission and reception of information to and from a communication network NW. As a wireless interface, for example, an interface is used in which a low-power wireless data communication standard such as a wireless local area network (LAN) is adopted.

An input device 50 (device) for an operator and an output device 60 attached to the network management device 100 are connected to the input/output interface 113.

The input/output interface 113 performs processing of fetching operation data input by an operator through the input device 50 such as a keyboard, a touch panel, a touchpad, or a mouse, and outputting output data to the output device 60 including a display device using liquid crystal, organic electro-luminescence (EL), or the like, to display the output data. Note that, as the input device 50 and the output device 60, a device built in the network management device 100 may be used, or an input device and an output device of another information terminal that can communicate with the network management device 100 via a network NW may be used.

A program memory 111B is used as a non-transitory tangible storage medium, for example, in a combination of non-volatile memory enabling writing and reading at any time, such as a hard disk drive (HDD) or a solid state drive (SSD), and non-volatile memory such as read only memory (ROM), and stores programs necessary for executing various control processing according to an embodiment.

The data memory 112 is used as a tangible storage medium, for example, as a combination of a non-volatile memory and a volatile memory such as a random access memory (RAM) and is used to store various types of data acquired and created in a process in which various types of processing is performed.

The network management device 100 according to an embodiment of the present invention can be configured as a data processing device including a failure influence determination processing unit 10, a Spec DB 20, and an entity DB 30 illustrated in FIG. 1, FIG. 9, or FIG. 16 as a processing function unit by software.

The Spec DB 20 and the entity DB 30 can be configured by using the data memory 112 illustrated in FIG. 22. However, these areas are not essential configurations in the network management device 100 and may be areas provided in, for example, an external storage medium such as universal serial bus (USB) memory or a storage device such as a database server arranged in a cloud.

All of the processing function units in each of the failure influence determination processing unit 10 can be implemented by causing the hardware processor 111A to read and execute a program stored in the program memory 111B. Note that some or all of these processing function units may be implemented in other various forms including an integrated circuit such as an application specific integrated circuit (ASIC) or a field-programmable gate array (FPGA).

In addition, the method described in each embodiment can be stored as a program (software means) that can be executed by a computing machine (computer), for example, in a recording medium such as a magnetic disk (such as a floppy (registered trademark) disk or a hard disk), an optical disc (such as a CD-ROM, a DVD, or a MO), or a semiconductor memory (such as a ROM, a RAM, or a flash memory), and can be distributed by being transmitted through a communication medium. Note that the program stored on the medium side also includes a setting program for configuring, in the computer, software means (including not only an execution program but also a table and a data structure) to be executed by the computer. The computer that implements the device executes the above-described processing by reading the programs recorded in the recording medium, configuring the software means by the setting program as needed, and controlling operations by the software means. Note that the recording medium in the present specification is not limited to a recording medium for distribution and includes a storage medium such as a magnetic disc or a semiconductor memory provided in a device connected inside a computer or via a network.

Note that the present invention is not limited to the above embodiments, and various modifications can be made in the implementation stage without departing from the gist thereof. In addition, the embodiments may be implemented in appropriate combination, and in this case, a combined effect can be obtained. Furthermore, the above embodiment includes various inventions, and various inventions can be extracted by a combination selected from a plurality of disclosed components. For example, even if some components are deleted from all the components described in the embodiment, a configuration from which the components have been deleted can be extracted as an invention, as long as the problem can be solved and the effects can be achieved.

Reference Signs List

100 Network management device
10 Failure influence determination processing unit
11 Affected path calculation processing unit
12 Device failure determination processing unit
12*a* Affected path acquisition processing unit
12*b* Device information acquisition processing unit
12*c* Device layer determination processing unit
12*d* Failure spread determination processing unit
12*e* Standby power supply depletion determination processing unit
12*f* Display processing unit

The invention claimed is:

1. A network management device comprising:
a storage device configured to store information indicating a connection relationship between a plurality of communication devices and a communication path in a network configuration, and layer information indicating layers of the plurality of communication devices; and
a determination unit comprising one or more processors, configured to:
when power from a main power supply is no longer supplied to a first communication device of the plurality of communication devices and power from a standby power supply is no longer suppliable to the first communication device, determine that a failure has occurred in the first communication device;
acquire information indicating a communication path connected to the first communication device based on the information stored in the storage device;

compare layer information of the first communication device with layer information of a second communication device connected to the acquired communication path; and when a result of the comparison indicates that the second communication device is in a lower layer than the first communication device, determine that the second communication device is within a failure influence range of the failure that has occurred based on the information stored in the storage device.

2. The network management device according to claim 1, wherein when power from the main power supply is no longer supplied to the first communication device and a period until the power supplied from the standby power supply to the first communication device is depleted has elapsed, the determination unit is configured to determine that a failure has occurred in the first communication device and determine that the second communication device is within the failure influence range based on the information stored in the storage device.

3. The network management device according to claim 1, wherein the plurality of communication devices are respectively separately accommodated in a plurality of buildings, and when a main power supply accommodated in one of the plurality of buildings has failed and a period until power supplied from a standby power supply accommodated in the building to the first communication device accommodated in the building is depleted has elapsed, the determination unit is configured to determine that a failure has occurred in the first communication device accommodated in the building and determine that the second communication device is within the failure influence range based on the information stored in the storage device.

4. The network management device according to claim 3, further comprising:

a display processing unit, when it is assumed that a main power supply accommodated in one of the plurality of buildings has failed and a standby power supply accommodated in the building is supplied to the first communication device accommodated in the building, configured to display a screen indicating that no failure has occurred in the first communication device accommodated in the building.

5. The network management device according to claim 3, wherein the determination unit is configured to determine a priority for deploying a power restoration supply vehicle among the plurality of buildings based on whether standby power in each building is depleted, prioritizing a building where standby power has depleted earlier over a building with an affected device but where standby power has not yet depleted.

6. The network management device according to claim 3, further comprising a display processing unit configured to perform an influence simulation displaying changes in the failure influence range on a screen in response to a user input advancing a simulated current time point along a time axis between a start time point and an end time point.

7. The network management device according to claim 6, wherein the display processing unit is further configured to change a visual display characteristic of a building on the screen to an alert state when a remaining period until standby power supplied to a communication device in the building is depleted becomes equal to or less than a predetermined threshold period.

8. A non-transitory computer readable medium storing a program, wherein execution of the program causes a processor to function as the network management device according to claim 1.

9. The network management device according to claim 1, wherein each of the plurality of communication devices is assigned a numerical layer value, where a smaller numerical value indicates a higher-layer device and a larger numerical value indicates a lower-layer device; and the determination unit is configured to determine that the second communication device is in a lower layer than the first communication device when the numerical layer value of the second communication device is greater than or equal to the numerical layer value of the first communication device.

10. The network management device according to claim 1, wherein when the determination unit determines that the second communication device is within the failure influence range, the determination unit is further configured to:

acquire information indicating a second communication path connected to the second communication device;

compare layer information of the second communication device with layer information of a third communication device connected to the second communication path; and when the third communication device is in a lower layer than or an equivalent layer to the second communication device, determine that the third communication device is also within the failure influence range.

11. A network management method to be performed by a network management device including a storage device configured to store information indicating a connection relationship between a plurality of communication devices and a communication path in a network configuration, and layer information indicating layers of the plurality of communication devices, the network management method comprising:

by a determination unit of the network management device, when power from a main power supply is no longer supplied to a first communication device of the plurality of communication devices and power from a standby power supply is no longer suppliable to the first communication device, determining that a failure has occurred in the first communication device;

acquiring information indicating a communication path connected to the first communication device based on the information stored in the storage device;

comparing layer information of the first communication device with layer information of a second communication device connected to the acquired communication path; and when a result of the comparison indicates that the second communication device is in a lower layer than the first communication device, determining that the second communication device is within a failure influence range of the failure that has occurred based on the information stored in the storage device.

* * * * *